(12) United States Patent
Mullen

(10) Patent No.: US 6,272,544 B1
(45) Date of Patent: Aug. 7, 2001

(54) DYNAMICALLY ASSIGNING PRIORITIES FOR THE ALLOCATION OF SERVER RESOURCES TO COMPLETING CLASSES OF WORK BASED UPON ACHIEVEMENT OF SERVER LEVEL GOALS

(75) Inventor: David Clarence Mullen, Newcastle, WA (US)

(73) Assignee: Avaya Technology Corp, Basking Ridge, NJ (US)

( * ) Notice: Subject to any disclaimer, the term of this patent is extended or adjusted under 35 U.S.C. 154(b) by 0 days.

(21) Appl. No.: 09/149,877

(22) Filed: Sep. 8, 1998

(51) Int. Cl.[7] ................................................. G06F 15/173
(52) U.S. Cl. .......................... 709/226; 709/103; 709/104; 709/223; 709/224
(58) Field of Search .................... 709/225, 226, 709/224, 100, 103, 104, 105

(56) References Cited

U.S. PATENT DOCUMENTS

| | | | | |
|---|---|---|---|---|
| 5,473,773 | * | 12/1995 | Aman et al. | 709/104 |
| 5,675,739 | * | 10/1997 | Eilert et al. | 709/226 |
| 5,748,468 | * | 5/1998 | Notenboom et al. | 700/3 |
| 5,825,869 | * | 10/1998 | Brooks et al. | 379/265 |
| 5,838,968 | * | 11/1998 | Culbert | 709/104 |
| 5,864,848 | * | 1/1999 | Horvitz et al. | 707/6 |
| 5,881,238 | * | 3/1999 | Aman et al. | 709/226 |
| 5,889,956 | * | 3/1999 | Hauser et al. | 709/226 |
| 5,903,641 | * | 5/1999 | Tonisson | 379/266 |
| 5,948,065 | * | 9/1999 | Eilert et al. | 709/226 |
| 5,987,117 | * | 11/1999 | McNeil et al. | 379/265 |
| 5,996,013 | * | 11/1999 | Delp et al. | 709/226 |
| 5,999,963 | * | 12/1999 | Bruno et al. | 709/104 |
| 6,052,723 | * | 4/2000 | Ginn | 709/223 |

* cited by examiner

Primary Examiner—Robert B. Harrell
Assistant Examiner—William C. Vaughn, Jr.
(74) Attorney, Agent, or Firm—David Volejnicek

(57) ABSTRACT

A facility for ranking service classes in terms of their relative levels of need for additional server resources is described. The facility utilizes a set of goals, each identifying a service class to which it applies and a goal criterion for the service class, and each specifying a desired service level specifying a minimum percentage of transactions of the service class identified by the goal for which the goal criterion should be satisfied. Each goal further specifies an indication of the level of importance of the goal. For each goal, the facility determines an achieved service level indicating the percentage of completed transactions of the service class identified by the goal for which the goal criterion specified by the goal was satisfied. The facility further identifies any goals whose desired service level exceeds their achieved service level. The facility then selects, for each service class identified by at least one identified goal, the goal identified by the service class whose importance indication indicates that it is the most important. The facility then ranks the selected service classes identified by the selected goals in accordance with the importance indications of the selected goals.

21 Claims, 7 Drawing Sheets

FIG. 2
SERVICE LEVEL GOALS
200

| PRIORITY LEVEL | SERVICE CLASS | GOAL CRITERION | DESIRED SERVICE LEVEL | |
|---|---|---|---|---|
| 1 | CALLS FROM PROSPECTS | NOT ABANDONED BEFORE BEING CONNECTED TO AN AGENT | 98%, MEASURED OVER EACH WEEK | 201 |
| 2 | TARGET PROSPECTS' PROCESSING | COMPLETED THE SAME DAY | 75% | 202 |
| 3 | CALLS FROM PREFERRED CUSTOMERS | NOT ABANDONED | 95%, MEASURED OVER EACH DAY | 203 |
| 4 | CALLS FROM PREFERRED CUSTOMERS | ANSWERED WITHIN 12 SECONDS | 85%, MEASURED OVER EACH DAY | 204 |
| 5 | CALLS FROM PROSPECTS | ANSWERED WITHIN 15 SECONDS | 95% | 205 |
| 6 | CLAIMS CALLS | ANSWERED WITHIN 60 SECONDS | 85% | 206 |
| 7 | FULFILLMENT PROCESSING | COMPLETED BY THE END OF THE NEXT BUSINESS DAY | 90% | 207 |
| 8 | FULFILLMENT PROCESSING FOR PROSPECTS | COMPLETED WITHIN 24 HOURS | 85% | 208 |
| 211 | 212 | 213 | 214 | |

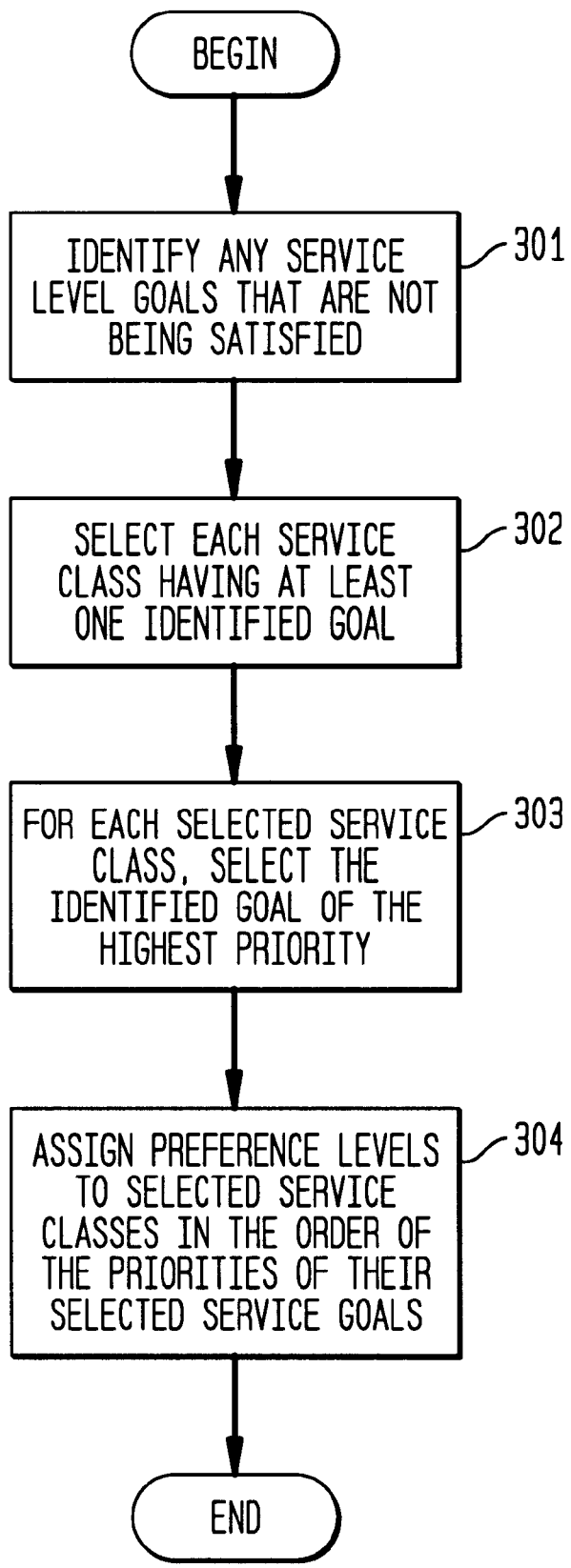

FIG. 4

SERVICE LEVEL GOALS
400

| PRIORITY LEVEL | SERVICE CLASS | GOAL CRITERION | DESIRED SERVICE LEVEL | ATTAINED SERVICE LEVEL | UNSATISFIED |
|---|---|---|---|---|---|
| 1 | CALLS FROM PROSPECTS | NOT ABANDONED BEFORE BEING CONNECTED TO AN AGENT | 98%, MEASURED OVER EACH WEEK | 95% | YES |
| 2 | TARGET PROSPECTS' PROCESSING | COMPLETED THE SAME DAY | 75% | 79% | |
| 3 | CALLS FROM PREFERRED CUSTOMERS | NOT ABANDONED | 95%, MEASURED OVER EACH DAY | 92% | YES |
| 4 | CALLS FROM PREFERRED CUSTOMERS | ANSWERED WITHIN 12 SECONDS | 85%, MEASURED OVER EACH DAY | 83% | YES |
| 5 | CALLS FROM PROSPECTS | ANSWERED WITHIN 15 SECONDS | 95% | 89% | YES |
| 6 | CLAIMS CALLS | ANSWERED WITHIN 60 SECONDS | 85% | 85% | |
| 7 | FULFILLMENT PROCESSING | COMPLETED BY THE END OF THE NEXT BUSINESS DAY | 90% | 55% | YES |
| 8 | FULFILLMENT PROCESSING FOR PROSPECTS | COMPLETED WITHIN 24 HOURS | 85% | 92% | |
| 411 | 412 | 413 | 414 | 415 | 416 |

Rows: 401–408

FIG. 6
SERVICE LEVEL GOALS 600

| PRIORITY LEVEL | SERVICE CLASS | GOAL CRITERION | DESIRED SERVICE LEVEL | ATTAINED SERVICE LEVEL | UNSATISFIED | SELECTED |
|---|---|---|---|---|---|---|
| 1 | CALLS FROM PROSPECTS | NOT ABANDONED BEFORE BEING CONNECTED TO AN AGENT | 98%, MEASURED OVER EACH WEEK | 95% | YES | YES |
| 2 | TARGET PROSPECTS' PROCESSING | COMPLETED THE SAME DAY | 75% | 79% | | |
| 3 | CALLS FROM PREFERRED CUSTOMERS | NOT ABANDONED | 95%, MEASURED OVER EACH DAY | 92% | YES | YES |
| 4 | CALLS FROM PREFERRED CUSTOMERS | ANSWERED WITHIN 12 SECONDS | 85%, MEASURED OVER EACH DAY | 83% | YES | |
| 5 | CALLS FROM PROSPECTS | ANSWERED WITHIN 15 SECONDS | 95% | 89% | YES | |
| 6 | CLAIMS CALLS | ANSWERED WITHIN 60 SECONDS | 85% | 85% | | |
| 7 | FULFILLMENT PROCESSING | COMPLETED BY THE END OF THE NEXT BUSINESS DAY | 90% | 55% | YES | YES |
| 8 | FULFILLMENT PROCESSING FOR PROSPECTS | COMPLETED WITHIN 24 HOURS | 85% | 92% | | |
| 611 | 612 | 613 | 614 | 615 | 616 | 617 |

FIG. 7
SERVICE LEVEL GOALS 700

| PRIORITY LEVEL | SERVICE CLASS | GOAL CRITERION | DESIRED SERVICE LEVEL | ATTAINED SERVICE LEVEL | UNSATISFIED | SELECTED | PREFERENCE LEVEL |
|---|---|---|---|---|---|---|---|
| 1 | CALLS FROM PROSPECTS | NOT ABANDONED BEFORE BEING CONNECTED TO AN AGENT | 98%, MEASURED OVER EACH WEEK | 95% | YES | YES | 3 |
| 2 | TARGET PROSPECTS' PROCESSING | COMPLETED THE SAME DAY | 75% | 79% | | | |
| 3 | CALLS FROM PREFERRED CUSTOMERS | NOT ABANDONED | 95%, MEASURED OVER EACH DAY | 92% | YES | YES | 2 |
| 4 | CALLS FROM PREFERRED CUSTOMERS | ANSWERED WITHIN 12 SECONDS | 85%, MEASURED OVER EACH DAY | 83% | YES | | |
| 5 | CALLS FROM PROSPECTS | ANSWERED WITHIN 15 SECONDS | 95% | 89% | YES | | |
| 6 | CLAIMS CALLS | ANSWERED WITHIN 60 SECONDS | 85% | 85% | | | |
| 7 | FULFILLMENT PROCESSING | COMPLETED BY THE END OF THE NEXT BUSINESS DAY | 90% | 55% | YES | YES | 1 |
| 8 | FULFILLMENT PROCESSING FOR PROSPECTS | COMPLETED WITHIN 24 HOURS | 85% | 92% | | | |
| 711 | 712 | 713 | 714 | 715 | 716 | 717 | 718 |

DYNAMICALLY ASSIGNING PRIORITIES FOR THE ALLOCATION OF SERVER RESOURCES TO COMPLETING CLASSES OF WORK BASED UPON ACHIEVEMENT OF SERVER LEVEL GOALS

TECHNICAL FIELD

The present invention is directed to the field of service provider allocation.

BACKGROUND OF THE INVENTION

Many service organizations need to dynamically allocate their service agents in order to attain certain goals. Such allocation is typically performed manually. Increasingly, external performance measures of service delivered dominate internal cost measures, such as utilization and labor costs. Such external measures often consist of classifying certain transactions into meeting or not meeting desired objectives and determining a proportion of those transactions meeting objectives. Such a proportion is called a service level. The service level is measured over some period of time or over some number of transactions.

Examples of service levels are the percentage of customer problems resolved without further activity, the percentage of dispatched taxicabs that reach the rider within the committed time, the proportion of telephone calls handled by a qualified representative without requiring a transfer or referral to another agent, the proportion of telephone calls that can be connected to an agent without delay, the proportion of e-mail requests that are answered within 24 hours, the percentage of on-time departures of city buses on a particular bus route on weekdays, the proportion of transactions handled not resulting in a customer complaint, the proportion of preferred customer calls handled by fully qualified agents, the percentage of Spanish speakers handled by an agent fluent in Spanish, the percentage of telephone calls not abandoned by the customer before connection to an agent, the percentage of customer inquiry telephone calls that are not blocked at the central office switch, the percentage of customer sessions with the self-service World Wide Web pages that are not aborted while waiting for a display, the percentage of customer requests via telephone that can be completed immediately while on the phone, the percentage of loan applications processed within one-half hour from the time of the request, and the percentage of priority telephone calls answered within 8 seconds and handled properly by a qualified agent.

A service organization's goal for a service level in this context is a particular desired value of the service level. The goal is said to be satisfied if the attained service level is at least as high as the desired service level for the goal. It is said to be unattained if the realized service level is less than the desired service level. For example, the goal of at least 85% of telephone calls from preferred customers each day being answered within 12 seconds would be attained if, among the telephone calls from preferred customers during the current day, 87% were answered within 12 seconds; inversely, if only 84% of such calls are answered within 12 seconds, the goal would be unattained. In this framework the goal is either attained or not. There is considered to be no extra benefit to attain a service level much higher than the goal.

The number of server resources allocated to a type of service often affects the service level achieved for that type of service. Usually, when such is the case the operation can reallocate servers to the subject work in order to achieve service level goals. Such reallocation generally incurs opportunity cost, however, since service levels for other work suffers. One can often justify this opportunity cost based on an appropriate priority hierarchy.

For example, suppose agents in a call center can handle both loan servicing and sales servicing transactions. When more agents are assigned to sales activities, sales servicing transactions experience a higher service level on answer delay—that is, the amount of time required to answer each sales call declines. Meanwhile, the loan servicing calls are not answered as promptly, reducing the service level for loan servicing transactions. The service organization may rationalize this by saying that loan servicing is relatively less important because it is not very likely that an existing customer will switch loan companies, and that the company presently needs to acquire new customers that could easily take their business to a competitor if their calls are not answered promptly. The service organization wants to satisfy the goal of loan servicing, but not at the expense of failing to reach the goal in sales. When the sales goal is not in jeopardy, but the loan servicing is failing to meet its goal, the service organization desires to allocate more resources to loan servicing. The service organization wants to meet both goals, but the sales goal is more important than the loan servicing goal and so may preempt it. That is, if the operation can only meet one goal it should be the sales goal.

The desire to allocate more server resources to some activity is typically contingent upon the alternative activities that the server resources can perform and the demand for such alternative activities. Each of these alternative activities is also potentially associated with various service levels, each of which has a goal and a level of attainment. So the reallocation of resources can depend upon service measures for all alternative work associated with each of the resources. Performing such a potentially complex allocation function manually can produce significantly sub-optimal results. Often the manual allocation is too late and leads to more problems when the reallocated agents are not returned to their preferred work soon enough.

The advent of skills-based server allocation, in which the skills of each individual server are considered in allocating servers, complicates the situation. This approach cannot tolerate simplifying fragmentation of resources into monolithic pools where distinguishing skills are ignored. For this reason, conventional automatic call distributors ("ACDs") fail to meet this need.

In this environment, the service organization wants to provide preferential treatment to work activities in a hierarchy that ensures that the best work item is given to a server in view of attained service levels and the stated priorities of service level goals. An automated system that distilled this information would have significant utility.

SUMMARY OF THE INVENTION

The present invention provides a software facility ("the facility") for dynamically assigning priorities, called "preference values," for the allocation of server resources to competing classes of work based upon achievement of service level goals. These preference values are said to rank the service classes in terms of their relative levels of need for additional server resources. In a preferred embodiment, the facility maintains a set of goals, each of which identifies a service class to which it applies. Each goal specifies a desired service level specifying a minimum percentage of transactions of the service class identified by the goal for which a goal criterion should be satisfied. Each goal further specifies that goal criterion, as well as an indication of the level of importance of the goal. For each goal, the facility determines an achieved service level indicating the percentage of completed transactions of the service class identified by the goal for which the goal criterion specified by the goal is satisfied. The facility further identifies any goals whose desired service level exceeds their achieved service level, and, for each service class identified by at least one identified goal, selects the goal identified by the service class whose importance indication indicates that it is the most important. The facility then ranks the service classes as identified by the selected goals in accordance with the importance indications of the selected goals.

Additional embodiments of the invention utilize the ranking constituted by the preference values in order to allocate servers among the transactions of the service classes. The allocated servers may be human servers. such as telephone operators, or automated servers, such as automated response units or web servers.

BRIEF DESCRIPTION OF THE DRAWINGS

FIG. 2 is a table diagram showing a sample set of service level goals.

FIG. 3 is a flow diagram showing the steps preferably performed by the facility in order to assign preference levels to service classes.

FIG. 4 is a table diagram showing identification by the facility of satisfied service level goals among a sample set of service level goals.

FIG. 6 is a table diagram showing the selection of unsatisfied service level goals among the sample set of service level goals.

FIG. 7 is a table diagram showing the assignment of preference levels to service level goals among a sample set of service level goals.

DETAILED DESCRIPTION OF THE INVENTION

Figure 1:
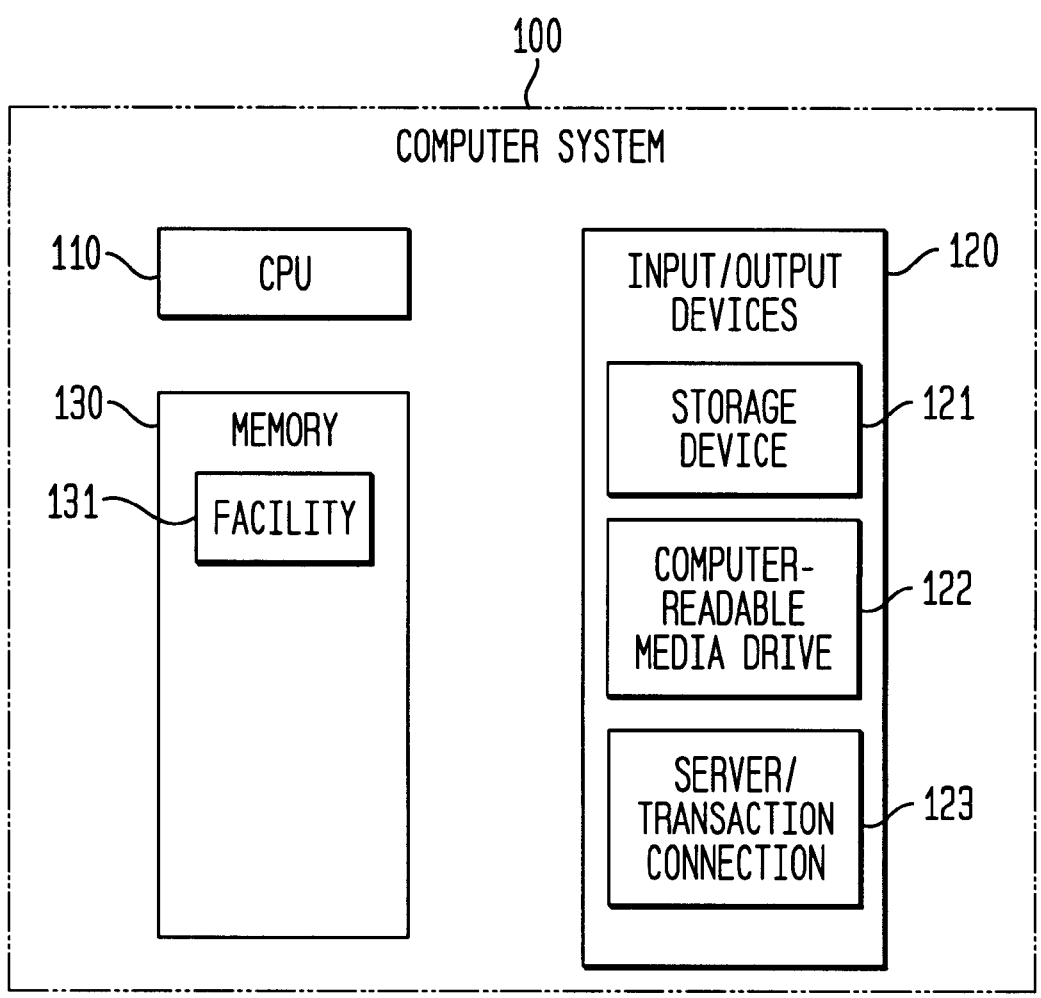
FIG. 1 is a high-level block diagram of a sample general-purpose computer system upon which the facility may execute.

The present invention provides a software facility ("the facility") for dynamically assigning priorities, called "preference values" for the allocation of server resources to competing classes of work based upon achievement of service level goals. The facility orders the classes of service demands that are subject to service level goals. These classes of service demands are herein called service classes. A service class is merely the part of the service level goal that defines the set of transactions that apply to the goal. The desired service level and the criteria for classifying the service into good or bad are not part of the service class. For example, assume an operation has the goal to process 80% of the e-mail inquiries from premium prospects within 6 hours. The "e-mail inquiries from premium prospects" is the service class that pertains to the goal. Whether or not an inquiry is processed within 6 hours does not affect membership in the service class, and the 80% goal value is not part of the definition of the service class.

It should be noted that the relationship between work items and service classes is generally not trivial. Service classes are not necessarily mutually exclusive, nor are they necessarily collectively inclusive. Service classes may be defined by attributes not related to server skills or they may be defined by the same attributes that define server skills. Additionally, there may be more than one goal pertaining to a service class.

The facility identifies for consideration those service level goals where the goal attainment is in jeopardy. It then identifies the service classes for each of these goals. For each of these service classes, the facility eliminates from consideration all but the highest priority goal associated with it. From the remaining goals, the facility identifies the one with the lowest priority and assigns a preference value of 1 to the goal's service class. Next, it finds the goal with the next highest priority and assigns a preference value of 2 to its service class. Then it assigns a preference value of 3 to the next highest priority goal and so on until it assigns a preference value to every service class with an unattained goal. In the case of more than one service class with the same priority, the preference value assigned is the same for each of the subject service classes. Service classes not affected by the affirmative assignment of preference values receive a preference value of zero.

The preference values of the service classes constitute a vector that functions as a control input to a work distributor or ACD (automatic call distributor). The preference values sway decisions on server assignments to work. The work distributor or ACD biases distribution of work to service classes in accordance with the magnitude of their preference values. Without the operation of a machine that utilizes this facility, the work distributor or ACD can still function, but without control for goal attainment. With a machine using the facility to set service class preferences, the work distributor or ACD adapts to realized service levels in order to reach the associated goals.

For example, in a situation in which an agent would be assigned to transactions of a first service class, the agent may be assigned to transactions of a second service class when the preference value of the second service class is sufficiently greater than the preference value of the first service class. The preference levels are preferably used to provide guidance to the work distributor, while the control of the matching of work with servers remains in the domain of the work distributor. The priorities of the service classes only affect work distribution in a marginal sense. For example, a high preference value for a service class cannot make an agent available for work which he is totally unqualified to perform. When no goals are in jeopardy, the facility gives a preference value of zero for all service classes. In this case, the work distributor matches servers with work using only the basic work distribution rules based on work attributes and agent profiles.

A service level in this context could be a simple average, a moving average, or exponentially smoothed. Other types of averages may also be used. Since each service class has its own service level goal(s), the facility may simultaneously process goals having several different service level types.

The facility systematically determines dynamic priorities of work to effect a maximization of goal attainment in a hierarchy of goals. It ensures that the highest priority goal is satisfied before consideration is given to lesser priority goals. Furthermore, it ensures that resources are not unduly allocated to the most important goals so as to achieve excess performance at the expense of secondary goals. In this context, the facility tries to achieve as many goals as possible.

This allows an operations manager or systems analyst to specify desired service performance largely without consideration of the organization of the servers, the organization of the work, the profiles of the servers, or the relationships between the goals. Furthermore, such performance specifications can be invariant with time. The subject facility enables a machine to dynamically change the effective assignment of agents or other servers. This is in stark contrast to the present industry practice of continual manual intervention to reallocate agents based on realized results. As noted above, often the manual dispatching is too late and leads to more problems when the reallocated agents are not returned to their preferred work soon enough.

The facility maximizes service goals without undue constraints from the organization of work, the organization of servers, or the conflicting nature of the goals. The facility benefits the overall level of customer service, and it reduces the burden of supervision and control of operations.

FIG. 1 is a high-level block diagram of a sample general-purpose computer system 100 upon which the facility may execute. The computer system 100 contains a central processing unit (CPU) 110, input/output devices 120, and a computer memory (memory) 130. Among the input/output devices is a storage device 121, such as a hard disk drive, and a computer-readable media drive 122, which can be used to install software products, including the facility, which are provided on a computer-readable medium, such as a CD-ROM. The input/output devices 120 further include a connection 123 to servers and transaction sources from which transactions are received. For example, the connection 123 may be used to connect the computer system to one or more computer telephony interfaces, World Wide Web servers, or World Wide Web browsers. This connection is usable by the facility to detect server availability, assign servers to applications and transactions, and monitor the processing of transactions by servers. The memory 130 preferably contains the facility 131.

While the facility is preferably implemented on a computer system configured as described above, those skilled in the art will recognize that it may also be implemented on computer systems having different configurations. For example, the facility may be implemented on a computer system having different components than described above. The facility may also be implemented on special-purpose computer systems, such as those in a call center. The facility may further be implemented without software in special-purpose hardware, using, for example, application-specific integrated circuits.

In order to more fully describe the details of the facility, its operation in conjunction with a specific example is discussed hereafter. This example is designed to provide a convenient basis for discussing the operation of the facility, and therefore is not necessarily representative in all senses of a typical application of the facility. Indeed, those skilled in the art will recognize that the facility may be applied to scenarios that are both more extensive and diverse than the scenario portrayed in the example.

FIG. 2 is a diagram of a service level goals table 200 showing a sample set of service level goals defined in the example. A set of service level goals is established in order to reflect the objectives to be met by the customer service organization, and is preferably established manually, for example, by a system administrator or a service manager. As is discussed in greater detail below, the facility uses the contents of the service level goals table 200 to assign preference values to service classes. The service level goals table 200 shows a series of eight sample goals 201–208. Each goal has a priority level 211 between 1 and 8. A goal's priority level reflects the desirability of satisfying that goal relative to the desirability of satisfying the other goals. For example, because goal 202 has priority level 2, it is less desirable to satisfy goal 202 than satisfy goal 201, while it is more desirable to satisfy goal 202 than goals 203–208. Each goal preferably has a different priority level, such that, for n goals, priority levels 1 through n are assigned.

Each goal also has a service class 212. The service class is an identification of the transactions to which the goal applies. For example, it can be seen from the service class of goal 207 that goal 207 applies to fulfillment processing transactions. It can further be seen from the service class of goal 208 that goal 208 applies to a subset thereof, i.e., fulfillment processing for prospects.

Each goal further has a goal criterion, which indicates the standard applied to determine whether a single transaction within the service class of the goal satisfies the goal. For example, it can be seen from goal 205 that, for goal 205 to be satisfied by a particular call transaction from a prospect, that call must be answered within 15 seconds.

Each goal further includes a desired service level 214. The desired service level indicates the minimum percentage of transactions within the goal's service class for which the goal criterion must be satisfied in order for the goal to be considered satisfied. For example, it can be seen from the desired service level of goal 204 that, in order for goal 204 to be satisfied, at least 85% of the calls from preferred customers received during the current day must have been answered within 12 seconds. Because the goal criterion and desired service level together specify a sought level of performance with respect to transacting in the goal's service class, the goal criterion and desired service level are said to comprise a "performance standard."

FIG. 3 is a flow diagram showing the steps preferably performed by the facility in order to assign preference levels to service classes based upon the contents of the service level goals table 200. These steps are preferably performed at least several times a day in order to maintain a set of up-to-date preference levels for allocating server resources, and may, in fact, be performed one or more times per minute. In step 301, the facility identifies any service level goals that are not being satisfied. Performing step 301 preferably involves first determining, for each service level goal, the attained service level for the service level goal—that is, the percentage of transactions within the service class of the goal for which the criterion of the goal has been satisfied. The facility then determines whether the goal is satisfied based on whether the attained service level is at least as large as the desired service level for the goal.

FIG. 4 is a diagram showing a table 400 of unsatisfied service level goals identified by the facility from among a sample set of service level goals. Comparing FIGS. 2 and 4, it can be seen that the contents of columns 411–414 in table 400 correspond to the contents of columns 211–214 in table 200. Table 400 also includes two additional columns: an attained service level column 415, and an unsatisfied column 416. The attained service level column 415 indicates, for each goal, the percentage of transactions within the service class of the goal for which the goal criterion was satisfied. For instance, it can be seen that for goal 403 the attained service level is 92%—that is, of all the calls from preferred customers during the current day, 92% of these calls were not abandoned. Attained service level is also sometimes referred to as "attained performance level." The unsatisfied column 416 indicates whether the goal is unsatisfied based on its attained service level—that is, whether the attained service level is smaller than the desired service level. For example, it can be seen that goal 403 is unsatisfied since its attained service level, 83%, is less than its desired service level, 85%.

Returning to FIG. 3, after the facility has identified any unsatisfied service level goals, the facility continues in step 302 to select each service class having at least one identified goal—that is, each service class having at least one unsatisfied goal.

Figure 5:
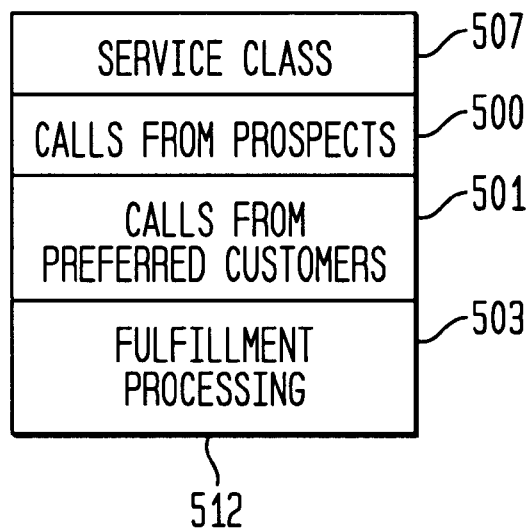
FIG. 5 is a table diagram showing the selection of service classes having unsatisfied service level goals.

FIG. 5 is a diagram of a table 500 showing the selection of service classes having unsatisfied service level goals. Comparing FIGS. 4 and 5, it can be seen that the facility has selected the calls from prospects service class 501 based on the failure to satisfy service level goals 401 and 405; has selected the calls from preferred customers service class 503 based on failure to satisfy goals 403 and 404; and has selected the fulfillment processing service class 507 based on failure to satisfy goal 407.

Returning to FIG. 3, after selecting each service class having at least one unsatisfied goal, the facility continues in step 303, for each selected service class, selecting the identified (unsatisfied) goal having the highest priority.

FIG. 6 is a diagram of a table 600 showing the selection of unsatisfied service level goals among the sample set of service level goals. Comparing FIGS. 4 and 6, it can be seen that the contents of columns 611–616 in table 600 match the contents of columns 411–416 in table 400. Table 600 further includes a selected column 617 that indicates for each goal whether the goal is selected in accordance with step 303. It can be seen that goal 601 is selected, since it has the selected calls from prospects service class and has a higher priority level (that is, a lower priority number) than goal 605, which also has the calls from prospects service class. Similarly, goal 603 is selected since it has the selected calls from preferred customers service class and has a higher priority level than goal 604. Finally, goal 607 is selected because it is the only goal having the fulfillment processing service class.

Returning to FIG. 3, after selecting goals as discussed in conjunction with FIG. 6, the facility continues in step 304 to assign preference levels to the selected service classes in the order of the priorities of their selected service goals. After performing step 304, these steps conclude, as the facility has completed its function of assigning preference levels.

Figure 8:
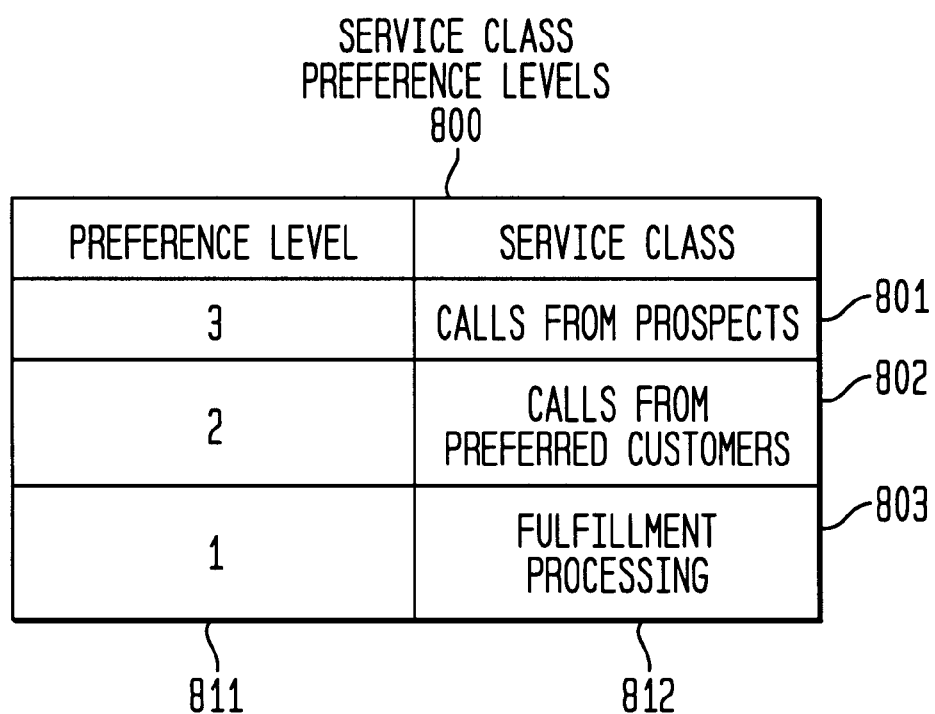
FIG. 8 is a table diagram showing the assignment of preference levels to service classes.

The performance of step 304 is discussed in conjunction with both FIGS. 7 and 8. FIG. 7 is a diagram of a table 700 showing the intermediate step of assigning preference levels to service level goals among a sample set of service level goals. It can be seen by comparing FIGS. 6 and 7 that the contents of columns 711–717 in table 700 match the contents of columns 611–617 in table 600. Table 700 further includes a preference level column 718, that indicates for each goal the preference level assigned to the goal. It can be seen that the facility began at the bottom of the table, at the lowest priority level (8) and moved upward in the table toward the highest priority level (1), assigning increasing integral preference levels beginning at 1 to each selected goal. Because goal 707 is the selected goal with the lowest priority level, it has received a preference level of 1. Because goal 703 is the selected goal with the next higher priority level, it has been assigned a preference level of 2. Finally, because the goal 701 is the selected goal with the next higher priority level, it has been assigned a preference level of 3.

FIG. 8 is a diagram of a table 800 showing the assignment of preference levels to service classes. It can be seen by comparing FIG. 8 to FIGS. 5 and 7 that each selected service class shown in FIG. 5 has been assigned the preference level of one of its goals shown in FIG. 7. For example, it can be seen that the calls from preferred customer service class 802, shown as selected in FIG. 5, has been assigned preference level 2, which was assigned to goal 703, which has the calls from preferred customer service class. The service class preference levels shown in FIG. 8 may be used by the facility and other entities to bias the supply of server resources toward those service classes having high preference levels. That is, there would be a heavier bias for assigning server resources to handling transactions within the calls from prospects service class than to handling transactions within the calls from preferred customers or fulfillment processing service classes. On the other hand, the bias toward assigning additional server resources to handling transactions within the fulfillment processing service class would only be stronger than any bias toward assigning server resources to transactions within service classes whose goals are being satisfied.

As an example, consider preference levels generated by the facility to bias the assignment of human servers who each express a level of affinity for each service class reflecting how much they enjoy processing transactions of each service class. In the case in which a particular server expresses an affinity level for the calls from preferred customers service class that is greater than his or her affinity level for the calls from prospects service class, this server is generally assigned to process transactions of the calls from preferred customers service class. However, in cases such as the case of the above example where the preference level of the calls from prospects service class exceeds the preference level of the calls from preferred customers service class, the service class preference levels could bias server allocation in such a way that the server is assigned to process transactions in the calls from prospects service class, despite his or her affinity to the contrary. Additional factors, such as server qualifications, may also be used in the resource allocation process.

While this invention has been shown and described with references to preferred embodiments, it will be understood by those skilled in the art that various changes or modifications in form and detail may be made without departing from the scope of the invention. For example, the preference levels generated by the facility may be used to assign resources of all types. Further, service levels that are not contiguous integers may be assigned by the facility, as may be non-numeric service levels.

I claim:

1. A method in a computer system for allocating server resources to each of a plurality of work types, the method comprising the steps of:

receiving a plurality of service level goals, each service level goal identifying a work type to which the goal applies, each service level goal further specifying a performance standard for the work type identified by the service level goal, the service level goals having an order from most significant to least significant;

identifying any service level goals within the plurality of service level goals whose performance standards are not satisfied with respect to the work types identified by the service level goals;

selecting each work type having at least one identified unsatisfied service' level goal, for each selected work type, selecting the identified unsatisfied service level goal identifying the work type that is most significant in the order of service level goals;

assigning preference levels to the selected work types such that the assigned preference levels relate directly to the position of the selected service level goals identifying the selected work types in the order of service level goals; and allocating server resources to the plurality of work types in accordance with the assigned preference levels;

wherein the allocating step allocates server resources to work transactions of the plurality of work types, and wherein the receiving step receives service level goals in which the performance standard is expressed using a goal criterion and a desired service level, the goal criterion specifying a standard sought to be satisfied for each transaction of the work type and the desired service level specifying a fraction of transactions of the work type for which the goal criterion is sought to be satisfied, and wherein the identifying step identifies service level goals whose goal criteria are not satisfied for at least the fractions of transactions of the work types specified by the desired service levels of the service level goals.

2. The method of claim 1 wherein the allocating step allocates server resources to work transactions of the plurality of work types, and wherein the receiving step receives service level goals in which the performance standard is expressed using a plurality of goal criteria each having a desired service level, each goal criterion specifying a standard sought to be satisfied for each transaction of the work type and its desired service level specifying a fraction of transactions of the work type for which the goal criterion is sought to be satisfied, and wherein the identifying step identifies service level goals that each have at least one goal criterion that is not satisfied for at least the fractions of transactions of the work type specified by the desired service levels of the service level goals.

3. The method of claim 1 wherein the allocating step allocates server resources to work transactions of the plurality of work types, and wherein the receiving step receives service level goals in which the performance standard is expressed using a desired service level and a plurality of goal criteria, the goal criteria each specifying a standard sought to be satisfied for each transaction of the work type and the desired service level specifying a fraction of transactions of the work type for which all of the goal criteria are sought to be satisfied, and wherein the identifying step identifies service level goals whose goal criteria are not all satisfied for at least the fractions of transactions of the work types specified by the desired service levels of the service level goals.

4. The method of claim 1 wherein the identifying step includes the steps of, for each service level goal:
assessing an attained performance level for the service level goal; and determining whether the attained performance level falls short of the performance standard for the service level goal.

5. The method of claim 1 wherein the identifying step includes the steps of, for each service level goal:
predicting a future attained performance level for the service level goal; and
determining whether the attained performance level falls short of the performance standard for the service level goal.

6. The method of claim 1 wherein the assigning step assigns human server resources to the work types in accordance with the preference levels assigned to the work types.

7. The method of claim 1 wherein the assigning step assigns automated server resources to the work types in accordance with the preference levels assigned to the work types.

8. A computer system for allocating server resources to each of a plurality of work types, comprising:
a memory storing a plurality of service level goals, each service level goal identifying a work type to which the goal applies, each service level goal further specifying a performance standard for the work type identified by the goal, the service level goals having an order from most significant to least significant;

a service level goal identifier that identifies any service level goals within the plurality of service level goals whose performance standards are not satisfied with respect to the work types identified by the service level goals;

a service level goal selector that, for each work type having at least one identified service level goal, selects the identified service level goal identifying the work type that is most significant in the order of service level goals;

a preference level assignment subsystem that assigns preference levels to the work types identified by the selected service level goals such that the assigned preference levels relate directly to the position of the selected service level goals in the order of service level goals; and a server resource allocator that allocates server resources to the plurality of work types in accordance with the assigned preference levels;

wherein the server resource allocator allocates server resources to work transactions of the plurality of work types, and wherein the memory stores service level goals in which the performance standard is expressed using a goal criterion and a desired service level, the goal criterion specifying a standard sought to be satisfied for each transaction of the work type and the desired service level specifying a fraction of transactions of the work type for which the goal criterion is sought to be satisfied, and wherein the service level goal identifier identifies service level goals whose goal criteria are not satisfied for at least the fractions of transactions of the work types specified by the desired service levels of the service level goals.

9. A computer-readable medium whose contents cause a computer system to allocate server resources to each of a plurality of work types by performing the steps of:
receiving a plurality of service level goals, each service level goal identifying a work type to which the goal applies, each service level goal further specifying a performance standard for the work type identified by the goal, the goals being ordered from most significant to least significant;

identifying any service level goals within the plurality whose performance standards are not satisfied with respect to the work types identified by the service level goals;

selecting each work type having at least one identified service level goal, for each selected work type, selecting the identified service level goal identifying the work type that is most significant in the order of service level goals;

assigning preference levels to the selected work types such that the assigned preference levels relate directly to the position of the selected service level goals identifying the selected work types in the order of t service level goals; and allocating server resources to the plurality of work types in accordance with the assigned preference levels;

wherein the allocating step allocates server resources to work transactions of the plurality of work types, and wherein the receiving step receives service level goals in which the performance standard is expressed using a goal criterion and a desired service level, the goal criterion specifying a standard sought to be satisfied for each transaction of the work type and the desired service level specifying a fraction of transactions of the work type for which the goal criterion is sought to be satisfied, and wherein the identifying step identifies service level goals whose goal criteria are not satisfied for at least the fractions of transactions of the work types specified by the desired service levels of the service level goals.

10. The computer-readable medium of claim 9 wherein the allocating step allocates server resources to work transactions of the plurality of work types, and wherein the receiving step receives service level goals in which the performance standard is expressed using a goal criterion and a desired service level, the goal criterion specifying a standard sought to be satisfied for each transaction of the work type and the desired service level specifying a fraction of transactions of the work type for which the goal criterion is sought to be satisfied, and wherein the identifying step identifies service level goals whose goal criteria are not satisfied for at least the fractions of transactions of the work types specified by the desired service levels of the service level goals.

11. The computer-readable medium of claim 9 wherein the allocating step allocates server resources to work transactions of the plurality of work types, and wherein the receiving step receives service level goals in which the performance standard is expressed using a plurality of goal criteria each having a desired service level, each goal criterion specifying a standard sought to be satisfied for each transaction of the work type and its desired service level specifying a fraction of transactions of the work type for which the goal criterion is sought to be satisfied, and wherein the identifying step identifies service level goals that each have at least one goal criterion that is not satisfied for at least the fractions of transactions of the work type specified by the desired service levels of the service level goals.

12. The computer-readable medium of claim 9 wherein the allocating step allocates server resources to work transactions of the plurality of work types, and wherein the receiving step receives service level goals in which the performance standard is expressed using a desired service level and a plurality of goal criteria, the goal criteria each specifying a standard sought to be satisfied for each transaction of the work type and the desired service level specifying a fraction of transactions of the work type for which all of the goal criteria are sought to be satisfied, and wherein the identifying step identifies service level goals whose goal criteria are not all satisfied for at least the fractions of transactions of the work types specified by the desired service levels of the service level goals.

13. For a plurality of service classes each corresponding to a type of transaction, a method in a computer system for ranking the service classes in terms of their relative levels of need for additional server resources, the method comprising the steps of:

maintaining a set of goals, each goal identifying a service class to which it applies, each goal specifying a desired service level specifying a minimum percentage of transactions of the service class identified by the goal for which a goal criterion should be satisfied, specifying the goal criterion, and specifying an indication of the level of importance of the goal;

for each goal, determining an achieved service level indicating the percentage of completed transactions of the service class identified by the goal for which the goal criterion specified by the goal was satisfied;

identifying any goals whose desired service level exceeds their achieved service level;

for each service class identified by at least one identified goal, selecting the goal identified by the service class whose importance indication indicates that it is the most important; and ranking the service classes identified by the selected goals in accordance with the importance indications of the selected goals.

14. The method of claim 13, further comprising the step of assigning server resources to process transactions of the service classes in accordance with the ranking of the service classes.

15. The method of claim 13 wherein the determining step projects an achieved service level indicating the percentage of completed transactions of the service class identified by the goal for which the goal criterion specified by the goal will be satisfied at a future time.

16. The method of claim 13 wherein the maintaining step maintains goals each having multiple goal criteria, each of the multiple goal criteria having a desired service level, and wherein the determining step determines an achieved service level for each criterion of each goal, and wherein identifying step identifies any goals where the desired service level for at least one criterion exceeds the achieved service level for that criterion.

17. For a plurality of service classes each corresponding to a type of transaction, a computer system for ranking the service classes in terms of their relative levels of need for additional server resources, comprising:

a memory storing a set of goals, each goal identifying a service class to which it applies, each goal specifying a desired service level specifying a minimum percentage of transactions of the identified service class for which a goal criterion should be satisfied, specifying the goal criterion, and specifying an indication of the level of importance of the goal;

a service level monitor that determines, for each goal, an achieved service level indicating the percentage of completed transactions of the service class identified by the goal for which the goal criterion specified by the goal was satisfied;

a goal discriminator that identifies any goals whose desired service level exceeds their achieved service level;

a goal selector that selects, for each service class identified by at least one identified goal, the identified goal identified by the service class whose importance indication indicates that it is the most important; and a service class ranking subsystem that ranks the service classes identified by selected goals in accordance with the importance indications of the selected goals.

18. For a plurality of service classes each describing a type of transaction, a computer-readable medium whose contents cause a computer system to rank the service classes in terms of their relative levels of need for additional server resources by performing the steps of:

maintaining a set of goals, each goal identifying a service class to which it applies, each goal specifying a desired service level specifying a minimum percentage of transactions of the identified service class for which a goal criterion should be satisfied, specifying the goal criterion, and specifying an indication of the level of importance of the goal;

for each goal, determining an achieved service level indicating the percentage of completed transactions of the service class identified by the goal for which the goal criterion specified by the goal was satisfied;

identifying any goals whose desired service level exceeds their achieved service level;

for each service class identified by at least one identified goal, selecting the identified goal identified by the service class whose importance indication indicates that it is the most important; and ranking the service classes identified by selected goals in accordance with the importance indications of the selected goals.

19. The computer system of claim 17 wherein the service level monitor includes a service level predictor that determines for each goal an expected service level indicating the percentage of transactions of the service class identified by the goal for which the goal criterion specified by the goal is expected to be satisfied at a future time.

20. A computer memory containing a service class preference data table usable to allocate server resources among service classes, the data structure comprising an ordered series of entries each corresponding to a different service class, the position of each entry in the ordered series indicating the relative extent to which allocation of server resources to the service class to which the entry corresponds is preferred over allocation of resources to other service classes, such that the order of the entries may be used to allocate service resources among service classes.

21. A computer memory containing a service class preference data table usable to allocate server resources among service classes, the data structure comprising a plurality of entries each corresponding to a different service class, each entry having a quantitative indication indicating the relative extent to which allocation of server resources to the service class to which the entry corresponds is preferred over allocation of resources to other service classes, such that the quantitative indications may be used to allocate service resources among service classes.

* * * * *